R. AND L. L. MOSER.
MOTOR PLOW.
APPLICATION FILED AUG. 30, 1919.
1,344,708.
Patented June 29, 1920.
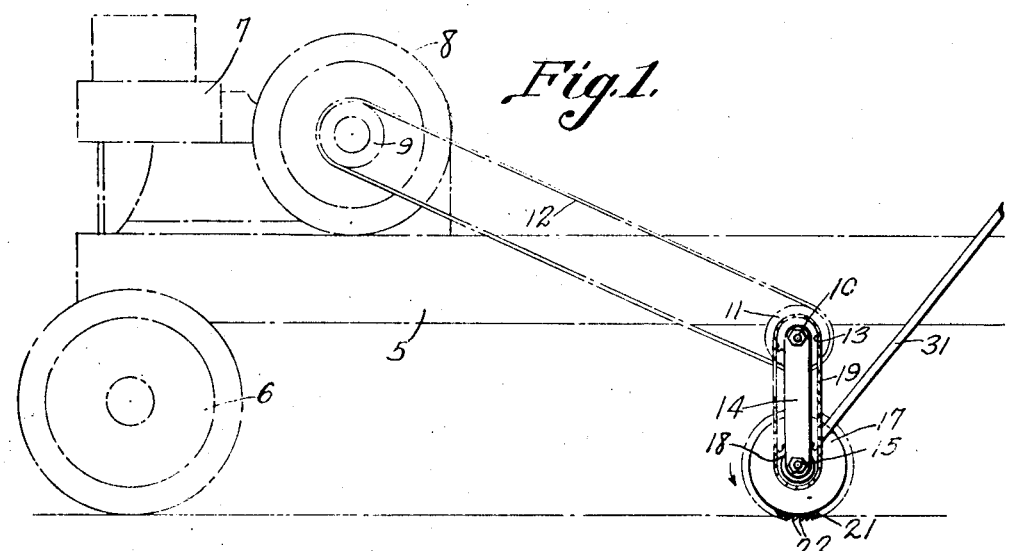
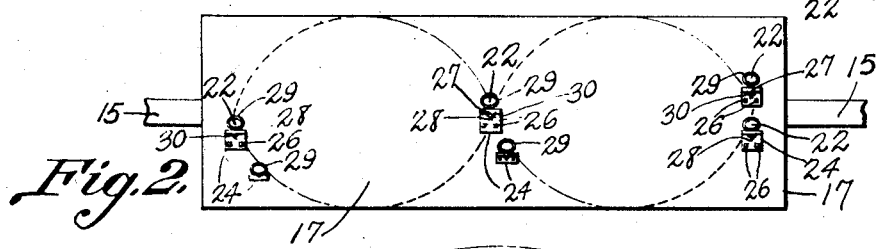
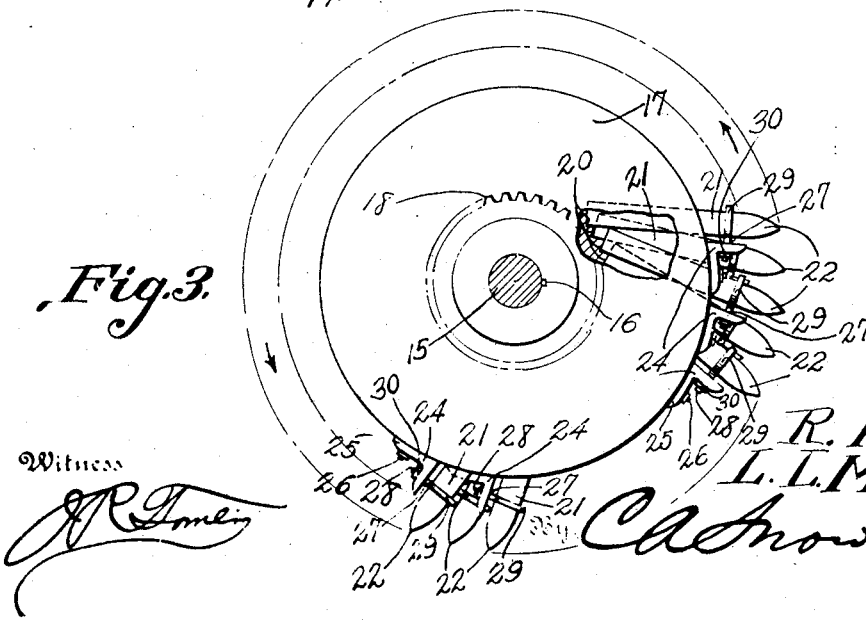
Inventor
R. Moser,
L. L. Moser

UNITED STATES PATENT OFFICE.

RUSSELL MOSER AND LESTER L. MOSER, OF HOMESTEAD, FLORIDA.

MOTOR-PLOW.

1,344,708.  Specification of Letters Patent.  Patented June 29, 1920.

Application filed August 30, 1919. Serial No. 320,894.

*To all whom it may concern:*

Be it known that we, RUSSELL MOSER and LESTER L. MOSER, citizens of the United States, residing at Homestead, in the county of Dade, State of Florida, have invented a new and useful Motor-Plow, of which the following is a specification.

This invention relates to new and useful improvements in agricultural machinery, and more particularly to motor plows of the rotary type.

The primary object of the present invention is to provide a device of this character which will function as a combined plow and harrow, thereby accomplishing the plowing and harrowing result in one operation.

A further object of the invention is to provide a rotary plow for cultivating hard rocky soil, in which it is practically impossible to use the ordinary mold board plow now in use.

A still further object of the invention is to provide means for securing the teeth of the plow to the cylinder carrying the same, so that the teeth may be easily and quickly removed if it becomes necessary to remove the same for sharpening or replacement in the event that the teeth are rendered inoperative.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

Referring to the drawings:—

Figure 1 is a side elevational view of a motor plow constructed in accordance with our invention.

Fig. 2 is a side elevational view of a rotary drum, and;

Fig. 3 illustrates an end elevational view of the drum, the same being shown as partly broken away.

Referring to the drawings in detail, the reference character 5 designates the carriage or frame of the plow, which as shown is supported by the wheels 6 and on which is mounted a suitable combustion engine 7 having the usual fly wheel 8, the same having connection with the belt pulley 9.

Disposed transversely of the frame 5 and mounted substantially centrally thereunder, is the horizontal drive shaft 10 having a belt pulley 11 supported adjacent one end thereof, said belt pulley having connection with the belt pulley 9 by means of the endless drive belt 12, operating over said pulleys 9 and 11.

It will therefore be seen that rotary movement of the fly wheel 8 is transmitted to the drive shaft 10, which has secured thereto by any suitable means not shown, the sprocket wheel 13.

On opposite sides of the frame 5 and depending from the drive shaft 10, are the bracket members 14 which as shown are apertured adjacent the lower ends thereof to provide bearings for the drum shaft 15 on which is supported the toothed drum 17.

As shown, the toothed drum 17 is substantially long and is keyed to the shaft 15 as at 16, whereby the same revolves with said shaft 15. Mounted on the shaft 15 adjacent one end thereof, is the sprocket wheel 18, which has connection with the sprocket wheel 13 by means of the chain 19, for transmitting rotary movement to the sprocket wheel 18, and consequently revolving the toothed drum 17.

Disposed within the drum 17 and arranged spirally around the periphery thereof, are relatively deep openings 20, the walls whereof as shown, extend at an angle with relation to the periphery of the drum 17, so that the teeth, or removable spikes 21 mounted therein, will be supported at an angle with relation to the surface of the soil over which the plow is moved.

The teeth or spikes 21 are pointed as at 22 to pierce, and dig up the soil being operated on, the openings 20 in which the spikes 22 are supported, being larger in diameter than the circumference of the spikes 22, thereby permitting the spikes to be easily and quickly removed.

Positioned adjacent each of the openings 20, but in spaced relation therewith, is a substantially short angle iron 24, one of the angle portions 25 thereof being bolted to the drum 17 as at 26, the opposite angle portion thereof being apertured as at 27 to receive the threaded shank 28 of the removable eye bolt 29, which is adapted to embrace the spike 22 positioned adjacent thereto and tightly grasp the same to prevent displacement thereof, when the nut 30, operating on the threaded portion 28 of the eye bolt 29, is rotated to the extent of its movement toward the angle iron.

Brace rods 31 have their lower ends connected to the shaft 15 the upper ends thereof being adjustably connected to the frame 5 by suitable means, not shown. It will therefore be seen that the drum 17 may be moved into and out of engagement with the surface over which the plow is moving, by merely adjusting the rods 31.

The operation of the device is as follows:—

The plow is moved into position at one end of the field to be cultivated, the engine is started, after the drum 17 has been moved into engagement with the surface of the soil over which the plow is to operate, with the result that the drum 17 is revolved at a high rate of speed, the teeth or spikes 22 carried by the drum piercing the soil to suitable depths, with the result that the ground is not only plowed, or dug up, but due to the close relation of one spike with the other, it will be seen that comparatively small portions of the soil are dislodged and the surface of the soil is in a condition, as if the same had been harrowed.

Having thus described our invention, what we claim is:—

In a rotary plow, a frame, a drum adjustably supported by the frame, said drum having a plurality of openings formed therein, an angle iron positioned adjacent each of the openings, an eye bolt having a threaded shank connected with the respective angle irons, a spike positioned in each of the openings, and adapted to be embraced by the eye bolts.

In testimony that we claim the foregoing as our own, we have hereto affixed our signatures in the presence of two witnesses.

RUSSELL MOSER.
LESTER L. MOSER.

Witnesses:
  GEO. L. REYNOLDS,
  W. M. BRADLEY.